United States Patent
Cinque

[11] 3,817,613
[45] June 18, 1974

[54] OPTICAL ENLARGING DEVICE

[76] Inventor: Alphonse P. Cinque, 65 Earle Ave., Lynbrook, N.Y. 11563

[22] Filed: July 27, 1971

[21] Appl. No.: 166,512

[52] U.S. Cl.................................. 353/67, 353/122
[51] Int. Cl.. G03b 21/06, G03b 21/10, G03b 21/28
[58] Field of Search............ 353/65, 66, 67, 46, 47, 353/50, 51, 74–78, 27

[56] References Cited
UNITED STATES PATENTS

| | | | |
|---|---|---|---|
| 2,691,916 | 10/1945 | Schick | 353/67 |
| 2,720,136 | 10/1955 | Frank | 353/67 |
| 3,224,321 | 12/1965 | Beck | 353/66 |
| 3,320,854 | 5/1967 | Wally | 353/27 |
| 3,642,361 | 2/1972 | Streu | 353/57 |

FOREIGN PATENTS OR APPLICATIONS

| | | | |
|---|---|---|---|
| 548,933 | 11/1957 | Canada | 353/67 |

Primary Examiner—Louis R. Prince
Assistant Examiner—A. Jason Mirabito
Attorney, Agent, or Firm—Edward H. Loveman

[57] ABSTRACT

An optical enlarging device for graphic copy comprises a base member with two copy supporting plates on the base member respectively movable in mutually perpendicular directions in a horizontal plane. A carriage assembly is adjustably supported by the base member over the copy surrporting plates by frame members and a balanced spring. An optical assembly in the carriage projects an upright enlarged correctly oriented readable image on a vertical screen carried by the carriage assembly.

2 Claims, 7 Drawing Figures

INVENTOR.
ALPHONSE P. CINQUE

BY Edward H Loveman

ATTORNEY

INVENTOR.
ALPHONSE P. CINQUE
BY

ATTORNEY

OPTICAL ENLARGING DEVICE

This invention concerns an optical enlarging device, and more particularly concerns an optical device for adjustably projecting an enlarged image of graphic material upon a vertical screen, the device being especially adapted for use in reading by visually handicapped persons.

Optical enlarging devices heretofore known have generally been used for photographic printing and similar purposes, and have fixed base plates upon which the copy to be enlarged was placed. The image was cast internally upon a photographic plate or screen and lacked adjustable features.

The present invention by contrast, has a copy holding plate which may be moved in a horizontal plane in mutually perpendicular directions laterally and longitudinally for conveniently reading large graphic copy such as a book, magazine, newspaper, etc. The device includes a hinged vertically adjustable carriage for a lens adjustable in focus, lamps for illuminating the copy being read, a translucent optical projection screen, and an optical system for projecting the enlarged, illuminated image of the copy on the screen. A novel spring balancing arrangement is employed for holding the carriage in a set position which permits easy and instant readjustment of position of the carriage. The copy may be turned page by page and moved back and forth and side to side for easy reading of the contents thereof.

It is, therefore, a principal object of the invention to provide a copy enlarging device for projecting an illuminated, enlarged image of the copy on a translucent screen as an aid in reading the copy.

Another object of the present invention is to provide a copy enlarging device with means for moving the copy in a horizontal plane in mutually perpendicular directions.

Still another object of the present invention is to provide a copy enlarging device with means for adjustably raising and lowering a carriage carrying a screen and an optical lens and mirror system.

These and other objects and many of the attendant advantages of this invention will be readily appreciated as the same becomes better understood by reference to the following detailed description when considered in connection with the accompanying drawings in which.

Figure 1:
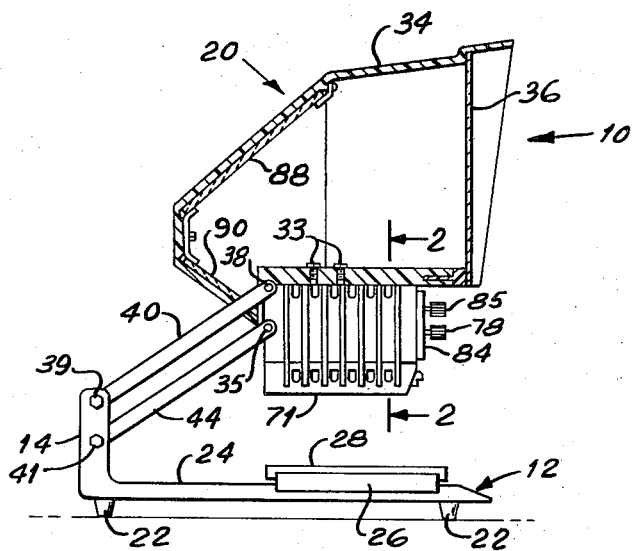
FIG. 1 is a side view of an optical enlarging deivce embodying the invention.
Figure 1A:
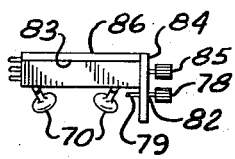
FIG. 1A is a side view of a subassembly including illuminating lamps and control panel of the device.
Figure 3:
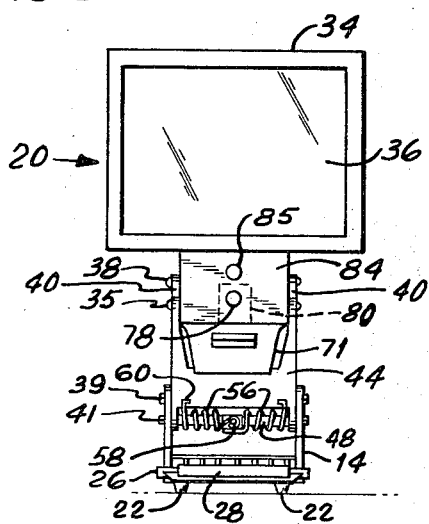
FIG. 3 is front elevational view of the device taken along line 4—4 of FIG. 1.
Figure 4:
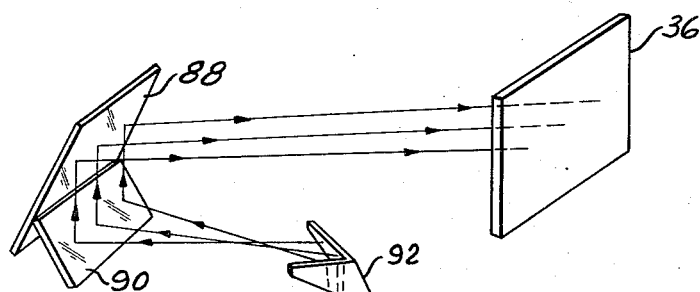
FIG. 4 is a perspective view partially diagrammatic in form of the optical system of the device.
Figure 6:
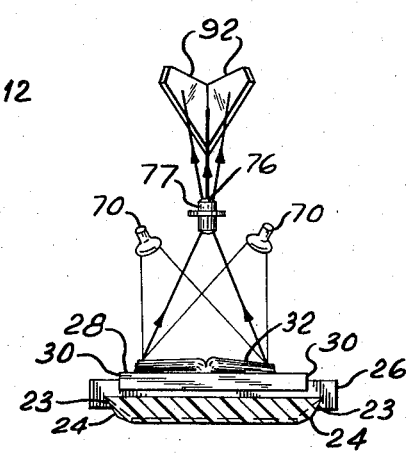
FIG. 6 is a vertical sectional view taken along line 6—6 of FIG. 5.
Figure 5:
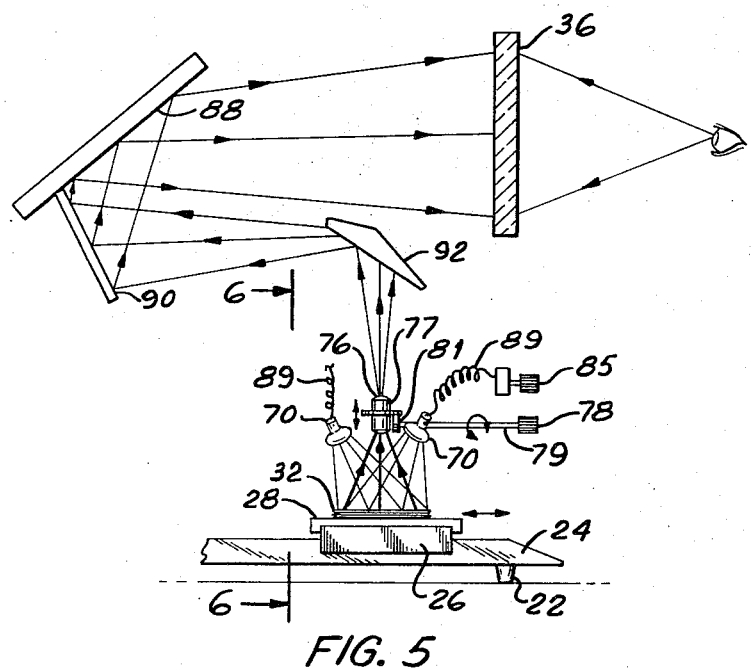
FIG. 5 is a side view partially diagrammatic in form of the optical system.

Referring, now to the drawings wherein like reference characters designated like or corresponding parts throughout, there is illustrated in FIG. 1 through FIG. 6 an optical enlarging device generally designated as reference numeral 10 comprising a horizontal, rectangular base plate 12 having an opposed pair of upright brackets 14, and a back wall 17 which serves as a support for a carriage assembly generally designated as reference numeral 20. The plate 12 is mounted on shock absorbing feet 22 located at each of the four corners and contains a pair of angular slide guides 24 each of which mate with a respective angular slide guide 23 on a slidable rectangular plate 26 movable longitudinally of plate 12 (FIGS. 4, 5 and 6). The plate 26 carries a copy support plate 28 provided with a pair of depending slide guides 30 engaging the front and rear edges of the plate 26. By this arrangement plate 28 may slide laterally to the right and left while plate 26 may slide longitudinally back and forth on the plate 12. A copy 32 such as a book shown in FIG. 6 may be mounted onto the plate 28 for enlargement by the optical system of the device.

The optical system is carried by the carriage assembly 20 and includes a molded dome structure 34 at the front of which is supported a vertical translucent screen 36 made of glass or plastic material. The dome structure 34 is secured to an optical housing 71 by bolts 33 or any other well-known conventional means. The housing 71 is supported by the upper ends of a pair of inclined bars 40 at opposite sides of the housing 71 by a pair of bolts 38. The lower ends of the bars 40 are pivotally attached to the upright brackets 14, at the rear of the base plate 12. Just below the inclined bars 40 is an inclined plate member 44 disposed parallel to the bars 40 and which is secured at its upper end to the housing 71, by a pair of bolts 35. The lower end of the bars 40 and the plate 44 are secured to the brackets 14 by bolts 39 and 41 respectively. Extending above the base 12 between the brackets 14 is a horizontal rod 48, which is also secured by the bolts 41 to the brackets 14. On this rod 48 is wound a pair of coil springs 56. The inner ends of the springs 56 are engaged on a projecting centered radial finger 58 on the rod 48. Outer ends 60 of the springs 56 bear against the underside of the plate member 44. By the arrangement described, the dome structure 34 is supported by the pairs of springs 56 which are so wound that they tend to be tightly wound and tensioned when the dome structure us lowered by moving the carriage 20 downwardly. The carriage 20 will remain in any elevated position set with respect to base plate 12, but can easily be raised and lowered.

Figure 2:
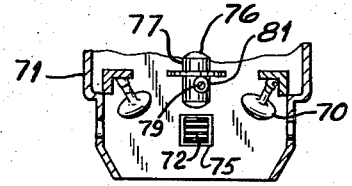
FIG. 2 is a fragmentary vertical sectional view taken along line 2—2 of FIG. 1.

The carriage structure 20 includes four lamps 70 in the housing 71, which are arranged to project light downwardly on the copy support plate 28, in all positions of adjustment thereof; see FIGS. 1A, 2, 4, 5, and 6. A fan 72 is supported by the housing 71, which is open at the bottom, as shown in FIG. 2, so that the fan 72 may draw heated air outwardly through a vent 75 in the rear wall of the housing 71 (FIG. 2).

The optical system of the device includes a lens assembly 76 having a cylindrical barrel 77 axially vertical and supported inside of the housing 71. The lens may be adjusted in focus by means of a control knob 78 mounted on a rotatable shaft 79 supported by a bearing bracket 80 in the housing 71 (FIG. 3). The knob 78 extends forwardly of a hole 82 in a control panel 84; see FIGS. 1, 1A and 4. A cam 81 is mounted on the shaft 79 which raises or lowers the lens barrel 77 for adjusting the focus of the image of copy 32 on the plate 28. The control panel 84 and a frame structure 86 form a shelf assembly 83 which is slidably mounted in the housing 71. This shelf assembly may be moved forwardly to expose lamps 70 for replacement; see FIG.

1A. The panel 84 carries a switch and dimmer control operated by a knob 85. The lamps and fan are energized via a flexible power supply cable 89, (FIG. 1) which has a female (not shown) connected for fitting over the male the housing 71. The optical system further includes a pair of mirrors 88, 90 supported in the frame structure 34 and angularly inclined with respect to each other and to the vertical screen plate 36; see FIGS. 1, 4, 5 and 6. A pair of smaller mirrors 92 are angularly inclined to one another and to the vertical axis of the lens barrel 77. The mirrors are supported in the optical path betseen the mirror 90 and the lens assembly 76; see FIGS. 4, 5 and 6. It should be noted that the images from the mirrors 92 are laterally cross projected into the mirror 90 as clearly shown in FIG. 4. Four reversals of the image of copy 32 are effected by mirrors 88, 90, 92 and lens assembly 76 so that the image of the copy is upright and correctly projected on the screen plate 36.

In operation of the device, the copy 32 to be read is placed on the horizontal copy support plate 28. Sufficient space is provided between the housing 71 and the plate 28 to permit pages of the copy to be turned easily. The copy may be moved backward and forward and laterally from side to side in a horizontal plane. The carriage assembly 20 may be moved up and down and the lens assembly 76 may be adjusted to focus the illuminated image of the copy on the translucent screen 36. The copy may be highly magnified so that only a portion of a page appears on the screen 36. The copy may be moved from side to side while being read as the plate 28 slides laterally on the plate 26. Similarly the plate 26 with the plate 28 carrying the copy 32 may be moved back and forth. The spring 56 supports the carriage assembly 20 in all positions of adjustment. Only slight manual pressure is required to raise and lower the carriage assembly 20.

The device may be manufactured at relatively low cost. It is durable in construction and will provide long trouble-free service. It is simple in operation and may be easily adjusted and operated.

It should be understood that the foregoing relates to only a preferred embodiment of the invention and that it is intended to cover all changes and modifications of the example of the invention herein chosen for the purposes of the disclosure, which do not constitute departures from the spirit and scope of the invention.

The invention claimed is:

1. An optical enlarging device for a graphic copy, comprising a base member;

a first plate horizontally supported on said base member and movable in one direction longitudinally thereof;

a copy supporting second plate horizontally supported on said first plate and movable in another direction laterally of said base member and perpendicular to said one direction;

a carriage assembly adapted to be positionally spaced above said graphic copy comprising a dome structure, a vertical translucent projection screen carried by said dome structure, an optical housing including a shelf assembly having a plurality of lamps which are arranged to illuminate said second plate in all positions of adjustment thereof, said optical housing having an open bottom and further including an electrically powered fan carried by said optical housing and arranged to withdraw air heated by said lamps, optical members in said housing disposed to define an optical path between said second plate and said screen for projecting an upright enlarged image of said copy on said screen; said optical members comprising a lens barrel for positioning over said copy and adapted to focus the image of said copy on said screen, a pair of small mirrors angularly inclined to one another and to the vertical axis of said lens barrel, a pair of larger mirrors supported in said housing and angularly inclined with respect to each other around a horizontal axis thereinbetween for projecting the image from said smaller mirrors to said screen and;

means adjustably supporting said carriage assembly on said base member for vertical movement over said first and second plates, whereby said carriage assembly is positionally spaced above said graphic copy so that an upright enlarged image thereof is projected on said screen by said optical members and said fan can draw air between said graphic copy and said carriage assembly into said optical housing to keep said lamps cool.

2. An optical enlarging assembly as defined in claim 1 wherein the last named means comprises a frame member pivotally attached to said base member, and coil springs mounted on said base member and disposed below said optical housing tending to lift the same for balancing the weight of said carriage assembly.

* * * * *